United States Patent
Kadokura et al.

(10) Patent No.: US 6,409,389 B1
(45) Date of Patent: Jun. 25, 2002

(54) HYDRODYNAMIC BEARING STRUCTURE, HYDRODYNAMIC BEARING APPARATUS, METHOD OF PRODUCING HYDRODYNAMIC BEARING APPARATUS, AND DEFLECTION SCANNING APPARATUS USING HYDRODYNAMIC BEARING APPARATUS

(75) Inventors: Susumu Kadokura, Sagamihara; Takamichi Ishino, Edosaki-machi; Masayoshi Asami, Funabashi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/553,855

(22) Filed: Apr. 21, 2000

(30) Foreign Application Priority Data

Apr. 22, 1999 (JP) .............................. 11-114341
Apr. 20, 2000 (JP) ....................... 2000-118852

(51) Int. Cl.$^7$ ............................... F16C 32/06
(52) U.S. Cl. ................... 384/100; 384/625; 384/909
(58) Field of Search .................. 384/100, 107–113, 384/114–120, 121, 123, 625, 909

(56) References Cited

U.S. PATENT DOCUMENTS

| | | | | |
|---|---|---|---|---|
| 5,315,196 A | * | 5/1994 | Yoshida et al. ............... | 310/90 |
| 5,357,163 A | * | 10/1994 | Minakuchi et al. ..... | 384/112 X |
| 5,366,298 A | * | 11/1994 | Toshimitsu et al. .......... | 384/107 |
| 5,606,448 A | * | 2/1997 | Suzuki et al. ................ | 359/200 |
| 5,769,544 A | | 6/1998 | Suzuki et al. ................ | 384/115 |
| 5,998,898 A | * | 12/1999 | Fukutani et al. ............... | 310/90 |
| 6,155,721 A | * | 12/2000 | Kurosawa et al. ........... | 384/100 |
| 2001/0000073 A1 | * | 3/2001 | Kobayashi et al. ......... | 384/100 |

FOREIGN PATENT DOCUMENTS

| | | | |
|---|---|---|---|
| JP | 63235719 A2 | | 9/1988 |
| JP | 7027131 | | 1/1995 |
| JP | 11-108050 A | * | 4/1999 |
| JP | 11-108051 A | * | 4/1999 |

* cited by examiner

Primary Examiner—Thomas R. Hannon
(74) Attorney, Agent, or Firm—Fitzpatrick, Cella, Harper & Scinto

(57) ABSTRACT

A shaft integral with a rotary polygon mirror is fitted in a sleeve having dynamic-pressure generating grooves to construct a hydrodynamic bearing. A bearing surface of the sleeve is subjected to an electroconductivizing treatment through formation of a chemical conversion film, and an electrodeposition film having a lubricating filler such as a silicon-based resin, inorganic particles, or the like dispersed therein is formed thereon. The film can be formed by electrodeposition which is simpler than plating, and wear resistance and lubricity of the bearing surface can be improved remarkably. The bearing structure prevents wear from occurring during low-speed rotation.

69 Claims, 7 Drawing Sheets

HYDRODYNAMIC BEARING STRUCTURE, HYDRODYNAMIC BEARING APPARATUS, METHOD OF PRODUCING HYDRODYNAMIC BEARING APPARATUS, AND DEFLECTION SCANNING APPARATUS USING HYDRODYNAMIC BEARING APPARATUS

BACKGROUND OF THE INVENTION

1. Field of the Invention

The present invention relates to a hydrodynamic bearing structure having hydrodynamic (dynamic-pressure) grooves and to a rotating apparatus having the hydrodynamic bearing structure, a deflection scanning apparatus, a laser beam printer, an image forming apparatus, and a rotating apparatus of hard disk. More particularly, the invention concerns a hydrodynamic bearing apparatus for rotationally supporting a rotary polygon mirror or the like for high-speed scanning with a light beam in laser beam printers, bar code readers, etc., a method of producing the hydrodynamic bearing apparatus, And a deflection scanning apparatus using the hydrodynamic bearing apparatus.

2. Related Background Art

The deflection scanning apparatus used in the laser beam printers, bar code readers, etc. is constructed to implement deflection scanning with a light beam such as a laser beam or the like by use of a rotary polygon mirror rotating at high speed. In the image forming apparatus such as the laser beam printers or the like, the scanning light yielded by the rotary polygon mirror is focused on a photosensitive body on a rotary drum to form an electrostatic latent image thereon, the electrostatic latent image on the photosensitive body is developed into a toner image by a developing device, the toner image is transferred onto a recording medium such as a recording sheet, and the recording medium with the toner image is transferred to a fixing device to heat the toner on the recording medium to fix it, thereby performing printing.

The deflection scanning apparatus of this structure has been increasing its operation speed and accuracy more and more in recent years and, in response thereto, the hydrodynamic bearing apparatus of a non-contact type to permit low-noise and high-accuracy rotation has been and is employed in the bearing part of the rotary polygon mirror.

FIG. 1 is a schematic, cross-sectional view showing a hydrodynamic bearing unit according to a conventional example. The bearing unit has a shaft 102, which is arranged to rotate integrally with a rotary polygon mirror 101 having a plurality of reflecting facets 101a, and a sleeve 103, in which the shaft 102 is fitted so as to be rotatable. The sleeve 103 is integral with a bearing housing 104. Fixed at the lower end of the sleeve 103 is a thrust pad 106 provided with a spherical portion 106a for supporting the lower end of the shaft 102 in the thrust direction. A flange 107 is fixed to the shaft 102 at the upper part thereof. The rotary polygon mirror 101 is pressed against the upper surface of the flange 107 by an elastic press mechanism 108 including a presser spring etc. to form an integral structure therewith, so as to rotate together with the shaft 102.

A yoke 109a holding rotor magnets 109 is fixed to the peripheral part of the flange 107 and the rotor magnets 109 are opposed to a stator coil 110 on a base plate 105 fixed to the bearing housing 104. When the stator coil 110 is energized by driving current supplied from a driving circuit (not shown), the rotor magnets 109 rotate at about 10,000 rpm together with the shaft 102 and rotary polygon mirror 101.

A fluid membrane is created between the sleeve 103 and the shaft 102 with rotation thereof, thereby constituting a hydrodynamic bearing which rotationally supports the shaft 102 in a non-contact state by the dynamic pressure of the fluid membrane. First dynamic-pressure generating grooves 102a and second dynamic-pressure generating grooves 102b are cut with some spacing in between and in the stated order in the upward direction from the lower end of the shaft 102 in the peripheral surface of the shaft 102. Shallow grooves (not shown) forming a hydrodynamic thrust bearing are also provided at the position facing the lower end of the shaft 102, in the upper surface of the thrust pad 106.

With rotation of the shaft 102, a fluid 111 such as oil or the like present in a bearing clearance between the shaft 102 and the sleeve 103 is pulled into the central part of each dynamic-pressure generating groove 102a, 102b to generate a high-pressure region there. Such high-pressure regions work to support the shaft 102 while maintaining the non-contact state in the radial direction between the shaft 102 and the sleeve 103. Because of this non-contact rotation, the above bearing structure has advantages of capability of yielding properties such as lower noise, higher rotation accuracy, etc. than sliding bearings accompanied by metal contact and capability of reducing the size and cost in terms of the number of assembled parts as compared with rolling bearings etc., for example.

There is, however, the possibility that the shaft becomes unable to rotate because of production of wear powder or because of impact or the like upon contact between the shaft and the sleeve during a start period, i.e., during increase of rotating speed, or during a stop period, i.e., during reduction of rotating speed, or at a complete stop when the rotating speed of the shaft is below steady-state values.

There are thus technologies developed to improve hardness, wear resistance, lubrication performance, etc. by placing a nickel plating or an anodic oxide film such as an anodized aluminum film or the like on the bearing surfaces of the shaft and sleeve (Japanese Patent Applications Laid-Open Nos. 63-235719 and 7-27131).

The methods of imparting the wear resistance and lubricating property (lubricity) to the surfaces by forming the plating film or the anodic oxide film on the bearing surfaces of the shaft, the sleeve, etc. according to the above prior art, are effective to a certain extent in preventing the production of wear powder during the start period or during the stop period, but they still have unsolved issues that the step of plating or anodic oxidation is complicated, it is difficult to ensure uniformity of film, and the cost is high because of countermeasures against environmental pollution.

There are demands for much quicker rotation of the rotary polygon mirror in recent years. For example, for rotating the mirror at the speed not less than 15,000 rpm, it is difficult to maintain the wear resistance and lubricity by the above prior art. More specifically, the nickel plating or the anodized aluminum film peels off during the high-speed rotation of the rotary polygon mirror. In addition, the nickel plating or the anodized aluminum film becomes easier to peel off as cumulative rotation time of the rotary polygon mirror increases.

SUMMARY OF THE INVENTION

The present invention has been accomplished in view of the unsolved issues of the above prior art and an object of the invention is to provide an inexpensive and high-performance hydrodynamic bearing apparatus capable of maintaining excellent bearing performance throughout a long period while avoiding the production of wear powder by forming an electrodeposition film for improving wear resistance on a fit surface of at least one of a shaft member and a sleeve member, a method for producing the hydrodynamic bearing apparatus, and a deflection scanning apparatus using the hydrodynamic bearing apparatus.

Another object of the present invention is to improve the lubricity as well as the wear resistance.

The present invention thus provides a hydrodynamic bearing structure comprising:
   a sleeve;
   a cylindrical shaft fitted in the sleeve;
      wherein at least one of the sleeve and the cylindrical shaft is rotatable,
      wherein a fit surface of at least one of the sleeve and the cylindrical shaft has an electrodeposition film, and
      wherein at least one of the sleeve and the cylindrical shaft is provided with a hydrodynamic groove pattern consisting of a plurality of grooves.

The present invention also provides a hydrodynamic bearing apparatus comprising a shaft member and a sleeve member fitted so as to be rotatable relative to each other, and a rotary member arranged to rotate together with the shaft member or the sleeve member, wherein an electrodeposition film in which a silicon-based resin or particles of an inorganic material are dispersed, is formed on a fit surface of at least one of the shaft member and the sleeve member.

The present invention also provides a method of producing a hydrodynamic bearing apparatus, the method comprising a step of electrodepositing an electrodeposition paint in which a silicon-based resin or particles of an inorganic material are dispersed, on a fit surface of at least one of a shaft member and a sleeve member fitted so as to be rotatable relative to each other.

The present invention can provide the hydrodynamic bearing structure in which the electrodeposition film is provided on at least one of the sleeve and the rod-like shaft.

Since this hydrodynamic bearing structure is improved in the wear resistance, the film is kept from peeling off even during high-speed rotation. The structure can also demonstrate high wear resistance, particularly, during increase of rotation speed or during decrease of rotation speed.

Since the electrodeposition step is an easy step, the production cost of the hydrodynamic bearing structure can be lowered.

The film can be formed while readily controlling the film thickness thereof. Therefore, a gap distance of the bearing clearance can be adjusted to a predetermined value.

Utilization of such a hydrodynamic bearing structure allows us to realize improvement in durability and reduction in cost of the deflection scanning apparatus, the image forming apparatus of the electrophotographic method such as the laser beam printers, copying machines, etc., the rotating apparatus of hard disk, and so on.

By providing the electrodeposition film containing the lubricating filler such as the silicon-based resin, the particles of the inorganic material, or the like, on the fit surface of the shaft member or the sleeve member, the wear powder is prevented from being produced upon contact between the shaft member and the sleeve member. The electrodeposition step is easier than the steps of plating, anodic oxidation, etc., and is thus carried out at low cost.

In addition, since it is also easy to control the film thickness of the electrodeposition film, the gap distance of the bearing clearance can be adjusted to a predetermined value by modifying the film thickness of the electrodeposition film on the fit surface of the shaft member or the sleeve member.

By forming the lubricating film by the easy and inexpensive electrodeposition step, the wear powder is prevented from being produced during the low-speed rotation, e.g., during the start period, during the stop period, and so on, thereby realizing the inexpensive hydrodynamic bearing apparatus with excellent bearing performance.

Application of such a hydrodynamic bearing apparatus to the bearing part of the rotary polygon mirror of the deflection scanning apparatus or the like, can contribute to attainment of higher performance and lower cost of the deflection scanning apparatus.

BRIEF DESCRIPTION OF THE DRAWINGS

FIGS. 2A, 2B and 2C show the main part of a hydrodynamic bearing apparatus and deflection scanning apparatus according to an embodiment of the present invention, wherein FIG. 2A is a schematic, cross-sectional view thereof, FIG. 2B is a cross-sectional view showing dynamic-pressure generating grooves in the inner surface of the sleeve, and FIG. 2C is a partly enlarged, cross-sectional view showing an enlarged cross section of a portion of the inner surface of the sleeve;

DETAILED DESCRIPTION OF THE PREFERRED EMBODIMENTS

Figure 1:
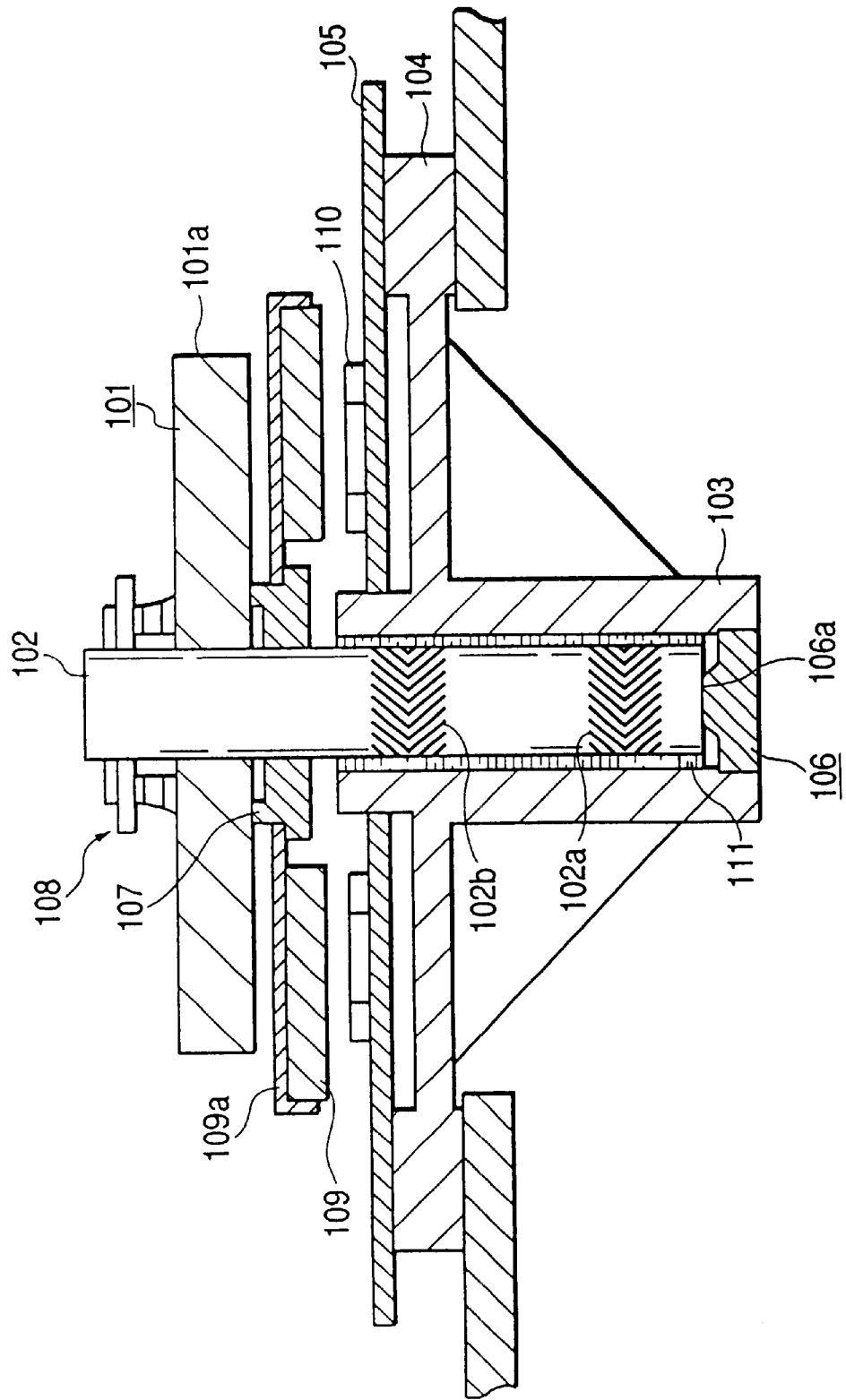
FIG. 1 is a schematic, cross-sectional view showing a conventional example.

The present invention is characterized in that the electrodeposition film is provided on the fit surface of either one of the sleeve and the rod-like shaft.

The electrodeposition is a step of electro-chemically forming an electrodeposition film on a metal electrode in a solution containing an inorganic substance of metal or the like and an organic substance. In this case the electrodeposition film is comprised of the organic substance of at least 0.1 wt % and the inorganic substance.

In this solution the organic substance is considered to be electrostatically adsorbing to around the inorganic substance to form colloid. In this state this organic substance is charged in the negative and the electrodeposition film with the organic substance and the inorganic substance both mixed is formed on the electrode. As a consequence, the resultant electrodeposition film contains a considerable amount of the organic substance. The electrodeposition film was able to be obtained in the composition containing the organic substance of several ten wt %.

A thick film was also able to be formed by the electrodeposition.

In addition, a thick film was able to be formed by the electrodeposition in a short time.

In contrast with it, for reference's sake, plating is a step of electrochemically forming a plating film on the electrode from an electrolyte of metal cations. The plating film contains little organic substance. The reason is that even if there exists the organic substance in the solution the mobility thereof in motion between the electrodes is much smaller than that of the metal cations. Therefore, the organic substance is not taken into the plating film.

For forming the plating film in the film thickness equivalent to that of the electrodeposition film, the time necessary therefore is approximately ten times the time necessary for attainment of the electrodeposition film.

Describing for reference's sake, an anodic oxide film is an oxide film formed in the electrode by electrochemically oxidizing the electrode in a solution. Namely, the electrode oxide film is a film resulting from oxidation of the electrode itself and the anodic oxide film contains little organic substance.

As described above, the electrodeposition film, the plating film, and the anodic oxide film are clearly different from each other. The electrodeposition film can be a flat film formed without following the surface shape of the electrode. In contrast, the plating film and anodic oxide film are formed so as to follow the surface shape of the electrode and it is thus extremely difficult to obtain a flat film thereof.

The organic substance forming this electrodeposition film is preferably one selected from anionic polymers, cationic polymers, etc. that are apt to move electrophoretically to the electrode in the solution. The polymers herein are polymers consisting of ten thousand or more monomer units.

The organic substance is preferably one readily moving to the electrode and demonstrating high wear resistance after hardened.

More specifically, it is preferable to use a copolymer compound obtained as a result of copolymerization between monomer units having an acrylic moiety, which facilitate attainment of a compound likely to be dissolved in the solution, and monomer units having a melamine moiety, which raise the wear resistance after curing. Since this organic substance is formed firmly on the electrode, the wear resistance is enhanced thereby. Since the flat film is formed of the organic substance on the electrode, smoothness, i.e., the lubricity is improved thereby.

The inorganic substance forming the electrodeposition film is employed for further enhancing the lubricity of the electrodeposition film and may be a substance forming solid particles in the solution, or guttulate-like (oil-droplet-like) particles to become a core substance of an emulsion in the solution. Further, the inorganic substance forming the electrodeposition film may also be a substance containing a mixture of both the solid particles and the guttulate particles.

A silicone resin may also be added to the organic substance forming the electrodeposition film. This silicone resin may be one dispersed in the form of solid particles in the solution or one dispersed in the form of guttulate particles in the solution. In cases where the resultant electrodeposition film contains the silicone resin, the organic substance and the silicone resin forming the electrodeposition film are preferably present in a blended state in which they cannot be discriminated from each other in appearance.

Namely, the solid particles in the present embodiment are preferably solid particles of molybdenum or a molybdenum-based substance, or solid particles of the silicone resin.

This silicone resin, or the molybdenum or molybdenum-based inorganic substance is provided for further improving the lipophilicity, i.e., the lubricity of the electrodeposition film.

Namely, by providing the electrodeposition film with lipophilicity, the lubricating oil contained in the gap between the shaft and the sleeve becomes more compatible with the electrodeposition film. As a consequence, the lubricity of the hydrodynamic bearing structure is enhanced, so as to improve the wear resistance, thereby facilitating realization of higher-speed rotation.

The surface roughness of the electrodeposition film is evaluated by surface roughness (Ra) defined as center-line mean roughness in B 0601 of Japanese Industrial Standards (JIS). The surface roughness (Ra) of the electrodeposition film is preferably not more than 0.5 $\mu$m in order to prevent stripping of the electrodeposition film, and more preferably not more than 0.2 $\mu$m. If the surface roughness Ra is larger than 0.5 $\mu$m the stripping of the electrodeposition film will become prominent.

The mean particle size of the inorganic particles contained in this electrodeposition film is preferably not more than 3.0 $\mu$m in order to increase the lipophilicity and prevent the stripping of the electrodeposition film, and more preferably not less than 0.02 $\mu$m and not more than 1.0 $\mu$m.

The coefficient of static friction of the electrodeposition film is preferably not more than 0.5 in order to attain high lubricity, and more preferably not more than 0.2.

It is needless to mention that the hydrodynamic bearing structure having this electrodeposition film demonstrates extremely good wear resistance and lubricity even under rotation at about 10,000 rpm; for example, it demonstrates extremely good wear resistance and lubricity under rotation at and above 18,000 rpm and, in addition, there appears no stripping of the film even under rotation at and above 25,000 rpm; that is, the wear resistance and lubricity both are extremely good.

A material for the member provided with the electrodeposition film out of the sleeve and the rod-like shaft is preferably an electroconductive material. The electrodeposition film is formed directly on the electroconductive material.

It is also more preferable to form an electroconductive film of a plating or the like on the electroconductive material and form the electrodeposition film on the electroconductive film, because the electrodeposition film is formed more firmly on the electroconductive material.

When the material for the member provided with the electrodeposition film out of the sleeve and the rod-like shaft, i.e., the substrate provided with the electrodeposition film is an electroconductive substance, the electroconductive substance may be one selected from metal materials such as stainless steel, brass, phosphor bronze, aluminum, and so on. These metal materials are preferable because they are resistant to mechanical stress and deformation. Among others, aluminum is particularly preferable because of its low weight.

The material for the member provided with the electrodeposition film out of the sleeve and the rod-like shaft, i.e., the substrate provided with the electrodeposition film may also be a non-electroconductive material. In this case, a preferred structure is such that the electrodeposition film is provided on an electroconductive film of a plating or the like placed on the non-electroconductive material. In that case, the non-electroconductive material may be a resin or a ceramic material. When the non-electroconductive material is the resin, the material may be one selected from acrylonitrile-butadiene-styrene copolymers (ABS), polycarbonate, and polyfluoroethylene-based polymer materials. When the substrate is either of these resins, the cost of the substrate itself can be reduced greatly.

The electrodeposition film can be provided on either of the sleeve and the rod-like shaft and is preferably provided on the fit surface of the member provided with the hydrodynamic grooves out of them.

As described above, the present invention can provide the wear-resistant hydrodynamic bearing structure by forming the electrodeposition film on the fit surface of at least one of the sleeve and the rod-like shaft. Further, the lubricity is also enhanced by adding the particles of the silicone resin or the inorganic substance to the electrodeposition film.

The electrodeposition film may also be provided on the both of the sleeve and the rod-like shaft.

Stripping of film will not occur even upon contact between the sleeve and the rod-like shaft, particularly, during transition from a rotating state to a stop of rotation or during transition from the stop state to the rotating state.

The hydrodynamic bearing structure of the present invention can be applied to rotating bodies.

These rotating bodies include, for example, the deflection scanning apparatus incorporated in the electrophotographic image forming apparatuses such as the laser beam printers, copying machines, etc., rotors of hard disks, and rotors in the bar code readers and the like.

The preferred embodiments of the present invention will be described below in further detail with reference to the drawings.

Figure 2A:
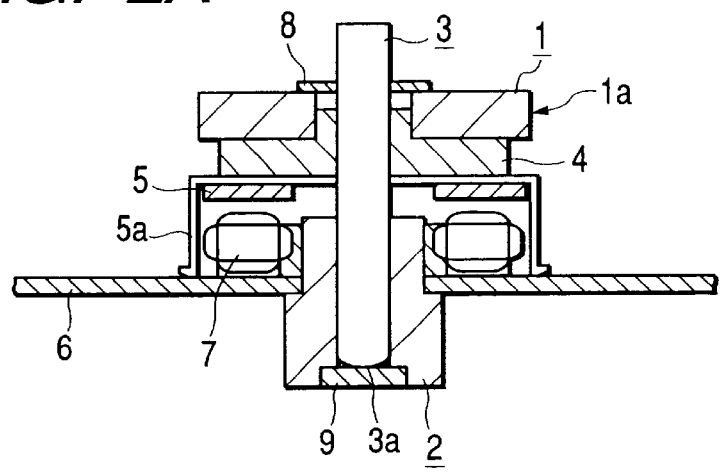

FIG. 2A is a schematic, cross-sectional view showing the main side part of the deflection scanning apparatus having the hydrodynamic bearing as a bearing part according to an embodiment of the invention. The apparatus has a rotary polygon mirror 1 of a deflection scanning means which has a plurality of reflecting facets 1a on side faces of a polygon, a sleeve 2 which is a sleeve member (bearing member) supported on the bearing housing integral with the optical box 50 illustrated in FIG. 8, a shaft 3 which is a shaft member (bearing member) fitted in the sleeve 2 so as to be rotatable, a rotor boss 4 which is a rotating member fixed to the shaft 3, a rotor frame 5a integrally coupled to the lower surface of the rotor boss 4, and a stator coil 7 fixed to a base plate 6 integral with the bearing housing, and the stator coil 7, together with rotor magnets 5 supported inside the rotor frame 5a, composes a motor to rotate the rotary polygon mirror 1. The rotary polygon mirror 1 is pressed against the rotor boss 4 by a keep plate 8 to be integrated with the rotating part including the rotor boss 4, the rotor frame 5a, the rotor magnets 5, and so on.

When the stator coil 7 is energized by driving current supplied via a driving circuit and a control circuit on the base plate 6, the rotor magnets 5 rotate together with the shaft 3 and the rotary polygon mirror 1, thereby implementing deflection scanning with the light beam such as the laser beam or the like guided onto the reflecting facet 1a of the rotary polygon mirror 1.

A thrust pad 9 is fixed to the sleeve 2 and is arranged so that a spherical end 3a of the shaft 3 is seated thereon, thus composing a pivot bearing.

Figure 2B:
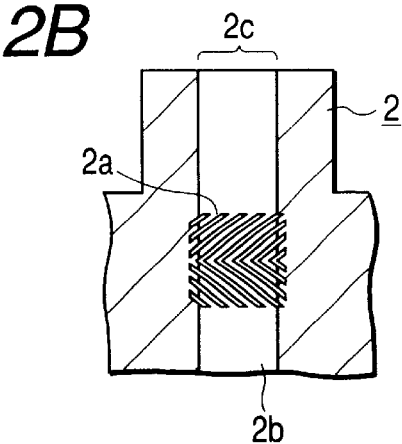

FIG. 2B is an enlarged cross-sectional view schematically showing a part of the sleeve 2 of FIG. 2A. The sleeve 2 is provided with a rod-like space 2c inside. Dynamic-pressure generating grooves 2a are cut, as illustrated in FIG. 2B, in the bearing surface 2b, which is the fit surface of the sleeve 2 forming this rod-like space 2c. When the shaft 3 rotates in the space 2c, the dynamic-pressure generating grooves 2c function to pull the fluid present in the bearing clearance, i.e., the fluid present in the gap between the shaft 3 and the sleeve 2, into the central region of the dynamic-pressure generating grooves 2a and increase the pressure of the fluid into a high-pressure state so as to separate the shaft 3 from the sleeve 2.

Figure 2C:
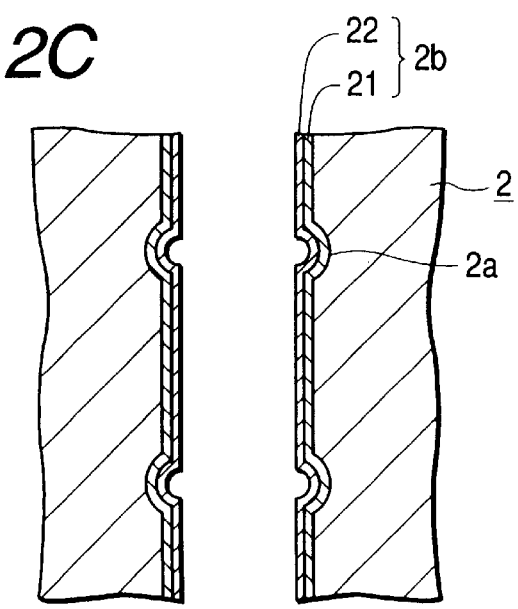

FIG. 2C is a schematic, cross-sectional view showing an enlarged view of the portion provided with the dynamic-pressure generating grooves 2a in the sleeve 2. In the present embodiment, the sleeve 2 having the dynamic-pressure generating grooves 2a is made of resin, the bearing surface 2b thereof is subjected, for example, to a so-called electro-conductivizing treatment to form a chemical conversion film 21 thereon, as illustrated in FIG. 2C, and an electrodeposition film 22 of a lubricating film is formed on the chemical conversion film 21. Since the base material of the sleeve 2 is the nonmetallic resin, the bearing surface of the sleeve needs to be made electrically conductive in order to provide the electrodeposition film on the bearing surface of the sleeve. For that purpose, the chemical conversion film 21 is formed on the resin sleeve. This chemical conversion film 21 may also be replaced by a plating film formed by an ordinary plating step. If the sleeve 2 is made of metal, the chemical conversion film 21 does not have to be provided.

The electrodeposition film 22 is the lubricating film made on the chemical conversion film 21 by electrodeposition under electrophoresis with the electrodeposition paint of the electrodepositable resin in which the silicon-based resin or the particles of the inorganic substance for imparting the lubricity are dispersed.

By providing the electrodeposition film 22 of the lubricating electrodeposition paint on the bearing surface of the sleeve 2 having the dynamic-pressure generating grooves 2a in this way, the lubricity and wear resistance of the bearing surface are improved, so as to prevent the production of wear powder upon contact between the sleeve 2 and the shaft 3, thereby avoiding trouble of rotation failure etc. due to the wear powder at the bearing part.

According to the present embodiment, the stable and good rotating state can be maintained throughout a long period while preventing the rotation failure etc. due to the wear of the bearing surfaces of the shaft and sleeve of the hydrodynamic bearing apparatus. In addition, there is no possibility of stripping of the coating film during rotation, the coating step is easy because of the electrodeposition coating, and thus the cost is low. It is also easy to ensure the uniformity of the coating film.

Further, because control of film thickness to modify the thickness of the coating film is also easy, the present embodiment offers the advantage of capability of readily correcting (or adjusting) the distance between the shaft and the sleeve, or the gap distance of the bearing clearance.

The present embodiment is the example in which the electrodeposition film is provided on the inner surface of the sleeve, but the electrodeposition film may also be formed on the outer surface (fit surface) of the shaft, or the electrodeposition film may also be provided on the fit surfaces of both the shaft and sleeve.

The above electrodeposition film is formed by electrophoresis on the metal or nonmetal bearing surface, using the electrodeposition paint in which the particles or the silicon-based resin acting as a lubricating filler is dispersed in the electrodepositable resin. This step will be detailed below.

In cases wherein the shaft and the sleeve of the hydrodynamic bearing apparatus are made of a nonmetallic material such as the resin or the like, the electrodeposition is carried out after the surface has been treated by the surface electroconductivizing treatment such as chemical plating, metal plating, or the like.

The resin used in the electrodeposition paint, i.e., the organic substance of the electrodeposition film is one selected from acrylic-melamine, acrylic, epoxy, urethane, and alkyd anionic or cationic resins.

The anionic resins used herein are, for example, resins obtained by introducing an anionic group such as a carboxyl group, a sulfonic acid group, or the like into resins such as acrylic resins, maleic acid resins, polyester resins, epoxy resins, polybutadiene resins, and so on. These resins are solubilized or dispersed in water by a basic substance such as triethylamine, diethylamine, dimethylethanol, ammonia, or the like, in the electrodeposition paint.

The cationic resins used herein are, for example, resins obtained by introducing a cationic group such as an amino group, an ammonium salt group, and an imino group into resins such as epoxy resins, acrylic resins, urethane resins, polyamide resins, polybutadiene resins, and so on. These resins are solubilized or dispersed in water by an acidic substance such as formic acid, acetic acid, propionic acid, lactic acid, or the like, in the electrodeposition paint.

With the anionic resins energization is effected while keeping the bearing member side of the shaft, the sleeve, or the like as an anode, whereas with the cationic resins energization is effected while keeping the bearing member side as a cathode.

In this energization process the anionic resin migrates to the anode surface of the bearing member to react with the acid group ($H^+$) produced near the anode by electrolysis of water to precipitate as an electrodeposition film. The cationic resin migrates to the cathode surface of the bearing member to react with the basic group ($OH^-$) produced near the cathode by electrolysis of water to precipitate as an electrodeposition film. Then the bearing member is taken out of an electrodeposition tank, washed with water, and thereafter dried.

The electrodeposition film formed in this way is preferably subjected to a curing process by heating or photoirradiation, thereby improving weatherability and chemical resistance. The anionic resins are cured, for example, by letting the hydroxyl group or methylolamide group introduced into the anionic resins react with the amino resin such as melamine resin, benzoguanamine resin, or the like. At this time the amino resin acts as a crosslinking agent. Another curing method is one making use of the double bonds of the anionic resins. The cationic resins are cured, for example, by a curing method of letting an isocyanate compound react with the hydroxyl group of the cationic resins or with the amino group introduced for conversion to cation, a curing method by oxidative polymerization, a curing method by transesterification, and so on.

The lubricating filler used is one selected from particles of molybdenum oxide, molybdenum disulfide, molybdenum, or the like having the mean particle size of 0.02 to 1.0 $\mu$m, and the silicon-based resin.

The lubricity is represented by the coefficient of static friction ($\mu$).

Figure 3:
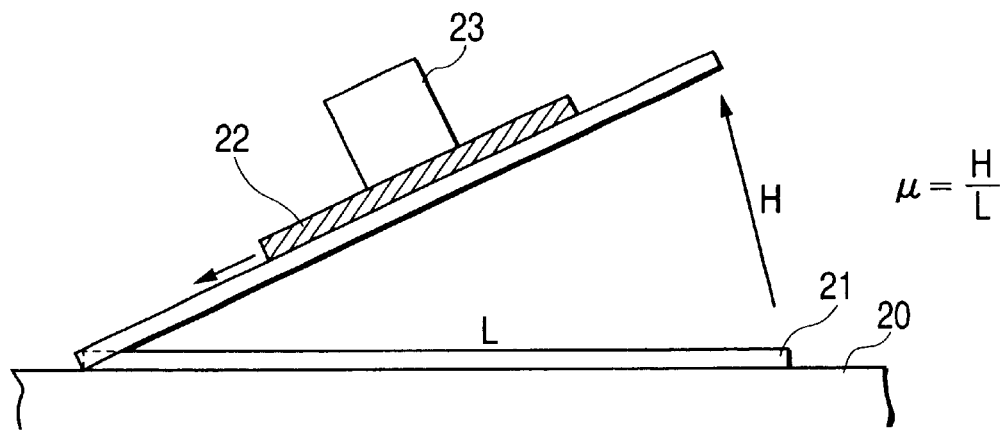
FIG. 3 is a diagram to explain a method of measuring a coefficient of static friction which represents the lubricity.

FIG. 3 is a diagram schematically showing an experiment to yield the coefficient of static friction.

The coefficient of static friction is obtained by the experiment as follows.

A sample 22 having an electrodeposition film formed on its surface (active area: 25 mm×50 mm) is mounted on a flat test plate 21 placed on a flat surface 20.

While the sample is kept under a weight 23 (200 g), one end of the test plate 21 is lifted up with the other end being fixed to the flat surface 20. When the sample 22 starts sliding on the test plate 21, an angle H is measured between the flat surface 20 and the lifted test plate 21. In addition, a distance L is measured at which the sample 22 has slid.

The coefficient of static friction ($\mu$=H/L) is calculated from the angle H and distance L thus obtained.

The material of the test plate 21 used is the material of the member without the electrodeposition film out of the sleeve and the rod-like shaft. Further, the sample 22 is the one in which the electrodeposition film is formed at least on the contact surface with the test plate 21.

The optimum particles having the lubricity are molybdenum compounds such as molybdenum oxide, molybdenum disulfide, molybdenum, and so on.

The coefficient of static friction ($\mu$) is preferably not more than 0.5 and most preferably not more than 0.2 in particular.

The above electrodeposition film has good lubricity and excellent performance including sufficiently high wear resistance, scratch resistance, high adhesion, high solvent resistance, and so on.

The surface roughness (Ra: center-line mean roughness) of the electrodeposition film is preferably not more than 0.2 $\mu$m.

An amount of the particles dispersed in the electrodeposition film is determined in connection with a rate to the resin part. If the amount of particles is too large the particles will drop to be the cause of production of dust after completion of products. If the amount of particles is too small the lubricity will tend to be low. Therefore, the amount of particles is preferably in the range of 0.5 to 15 parts by weight and particularly preferably in the range of 1 to 7 parts by weight per 100 parts by weight of the resin. The shape of the particles may be either delomorphous or amorphous. These, together with the resin, are put in the specified amount into a vessel and dispersed in a ball mill for 24 or more hours. Thereafter, they are diluted with demineralized water preferably to the solid content of 5 to 20 wt % and particularly preferably to the solid content of 7 to 17 wt %.

The coated object such as the shaft or the sleeve is set as an anode against the counter electrode in the anionic electrodeposition, whereas the coated object is set as a cathode in the cationic electrodeposition. Under such appropriate conditions that the bath temperature is in the range of 20 to 25° C., the applied voltage in the range of 70 to 200 V, the current density in the range of 0.5 to 5 A/cm$^2$, and the treatment time in the range of 1 to 5 minutes, the coating film is formed on the coated object, thereafter washed with water, and cured in the range of 70 to 200° C. for 20 to 120 minutes, thus completing the electrodeposition film.

At this time the electrodeposition film can be gained in any thickness in the range of 0.2 to 50 $\mu$m. The content of the particles with lubricity is preferably 1 to 7 wt % and particularly preferably 3 to 5 wt %.

When the electrodeposition film is formed by dispersing the silicon-based resin or the particles of the inorganic substance in the electrodepositable resin in this way, the lubricity can be enhanced remarkably by the eutectic effect.

In terms of the physical properties of the coating film, in addition to the effect of preventing seizure or the like of the bearing by improvement in the surface roughness, i.e., improvement in smoothness, and improvement in the wear resistance, there appeared no dust due to a drop of the particles, which was observed, for example, in the case of spray coating, there was no problem in adhesion, for example, the hardness was 3 H or higher, and as to the solvent resistance, the coating film was not affected, for example, even in the solvent of methyl ethyl ketone.

An eutectic amount of the particles is measured by thermogravimetry. The eutectic amount of particles is also checked by an X-ray microanalyzer.

The surface roughness was measured by trade name "Surfcom" available from Tokyo Seimitsusha.

EXAMPLES

The following examples are given for the purpose of illustration and not by way of limitation.

Example 1

The electrodeposition was carried out according to the following steps on the internal surface of the sleeves the respective base materials of which were brass and phosphor bronze.

Two types of electrodeposition paints were prepared by adding particles of molybdenum disulfide 2 wt % to either of colorless silicon-melamine base resin 15 wt % (for example, trade name: "Honny Bright HT-8," available from Honny Chemical, Co.) and colorless acrylic-melamine base resin 15 wt % (for example, trade name: "Honey Bright C-1," available from Honey Kaseisha), dispersing them in the ball mill each for twenty four hours, and thereafter diluting each of them with demineralized water until the total volume became two liters. Then two sleeves were treated at 60° C. in a solution of alkali cleaner (Pakuna JY30. available from Yuken Kagakusha) of 30 g/liter for five minutes, washed with water, treated at 80° C. in a solution of caustic soda of 50 g/liter for five minutes as a chemical conversion treatment, and washed with water, and thereafter the electrodeposition using the aforementioned two types of electrodeposition paints was carried out on the respective sleeves.

Under such electrodeposition conditions that pH was 8.0 to 8.2, the bath temperature was 20 to 25° C., the coated object was the anode, the counter electrode was a stainless steel plate having the thickness of 0.5 mm, and the applied voltage of the dc power supply was increased at intervals of 25 V from the minimum of 50 V to the maximum of 200 V, the electrodeposition was carried out for a constant electrolytic time of two minutes at each of the applied voltages.

Figure 4:
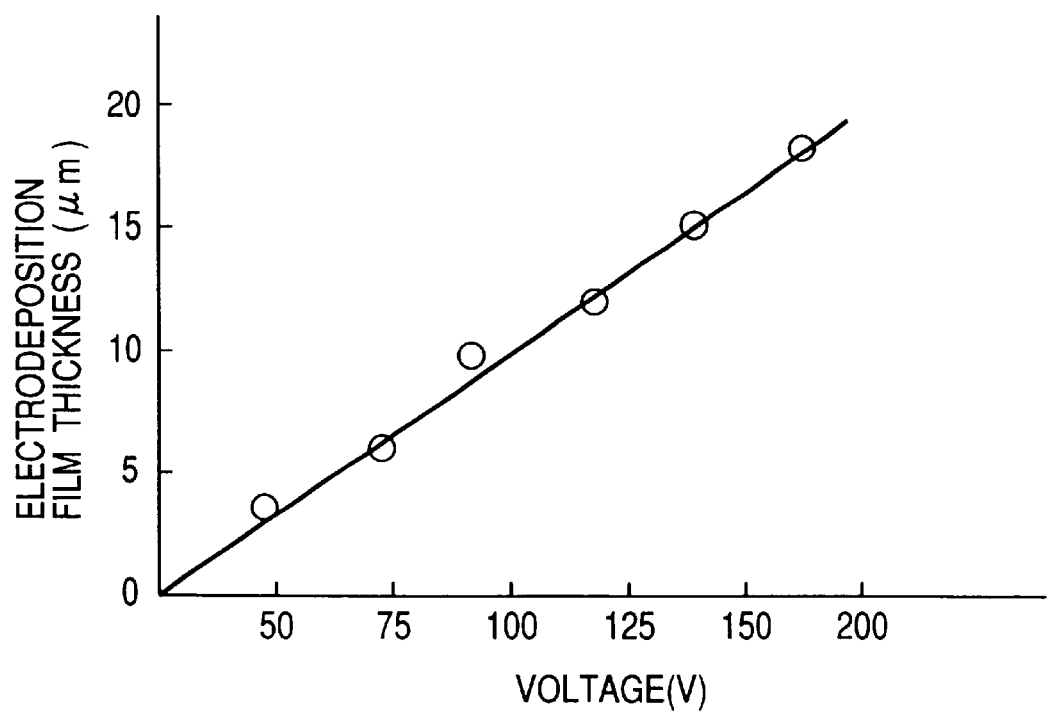
FIG. 4 is a graph showing the relationship between electrodeposition film thickness and voltage.

FIG. 4 shows the results of formation of the electrodeposition film on the sleeve by application of each applied voltage for two minutes.

In FIG. 4 the horizontal axis represents applied voltage values, while the vertical axis thickness values of the electrodeposition film formed on the sleeve. As seen from FIG. 4, the values of thickness of the resultant electrodeposition film are increasing in proportion to the values of applied voltage.

Then the sleeves were washed with water and finally washed with demineralized water. Thereafter, the sleeves were baked in an electric furnace in the atmosphere of 95±1° C. for the clear acryl-melamine base resin or in the atmosphere of 150±1° C. for the clear silicon-melamine base resin for thirty minutes, thereby obtaining the sleeves with the respective electrodeposition films.

There was no difference between the characteristics of the electrodeposition films formed on the respective sleeves by use of these two types of electrodeposition paints. When they were assembled in the apparatus of FIG. 2 to be evaluated, it was proved that they were the hydrodynamic bearing devices with high lubricity and high durability. The results of measurement of the surface roughness of the sleeves are presented in FIG. 5.

Figure 5:
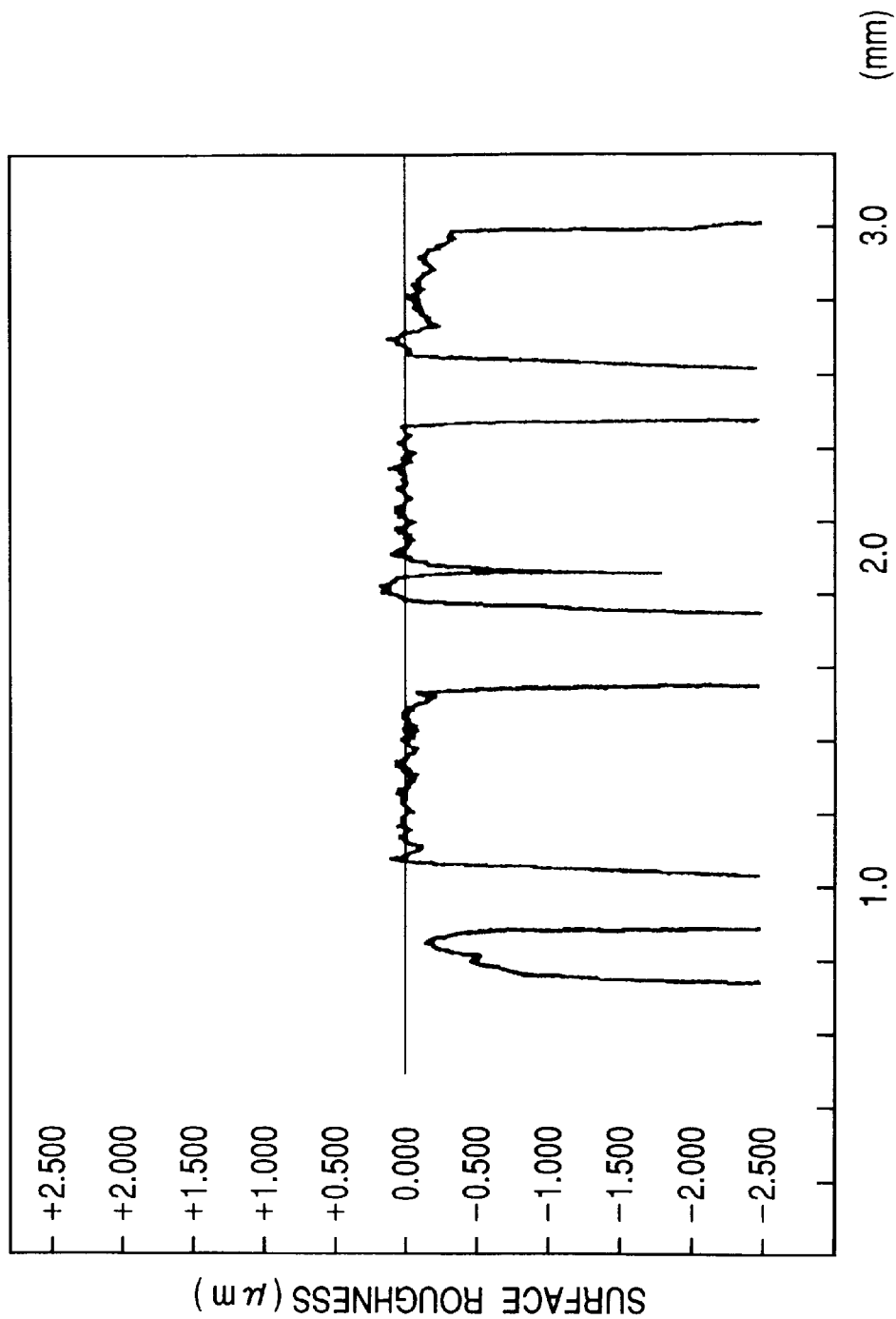
FIG. 5 is a graph showing the result of measurement of surface roughness of an electrodeposition film.

FIG. 5 is a graph showing the measurement results of the surface roughness of the resultant electrodeposition films.

The horizontal axis represents distances from a reference position which was defined at an arbitrary thickness position of the electrodeposition films.

The vertical axis represents a difference between the thickness of the electrodeposition film and the thickness of the electrodeposition film at the aforementioned reference position, at each of measurement positions.

As apparent from FIG. 5, the resultant electrodeposition films demonstrated only the small difference of about ±0.2 μm at each position from the reference position. This proved that the resultant electrodeposition films in the present example had the extremely smooth surfaces.

Example 2

The electrodeposition was carried out according to the same steps as in Example 1, except that the chemical conversion treatment of an aluminum surface was carried out at 50° C. in a solution of sodium bichromate of 5 g/liter for two minutes on the inner surface of the sleeve the base material of which was aluminum.

Example 3

The electrodeposition was carried out according to the same steps as in Example 1, except that the chemical conversion treatment of a stainless steel surface was carried out at 100° C. in a solution of Ebonol S (available from Meltec) of 570 g/liter for five minutes on the inner surface of the sleeve the base material of which was stainless steel.

The samples in Examples 2 and 3 also demonstrated the proportional relation between the applied voltages and the electrodeposition film thicknesses almost similar to that in FIG. 4 of Example 1.

Example 4

A resin sleeve obtained by molding and a sleeve formed of ceramic were prepared as the base materials and each subjected to plating, and an electrodeposition film was then formed on each sleeve by the same electrodeposition step as in Example 1.

Comparative Examples

Figure 6:
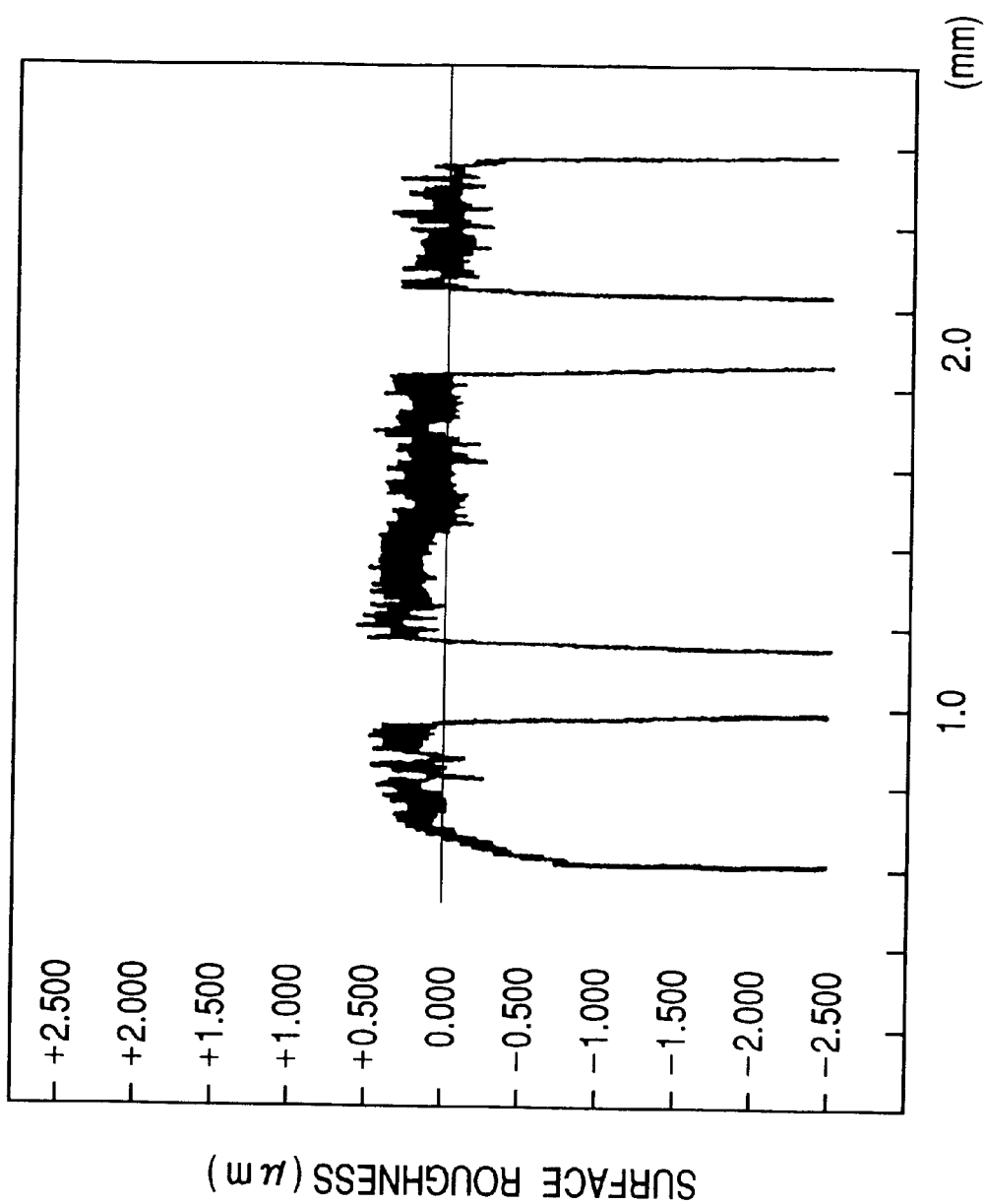
FIG. 6 is a graph showing the result of measurement of surface roughness of an electroless nickel plating film.
Figure 7:
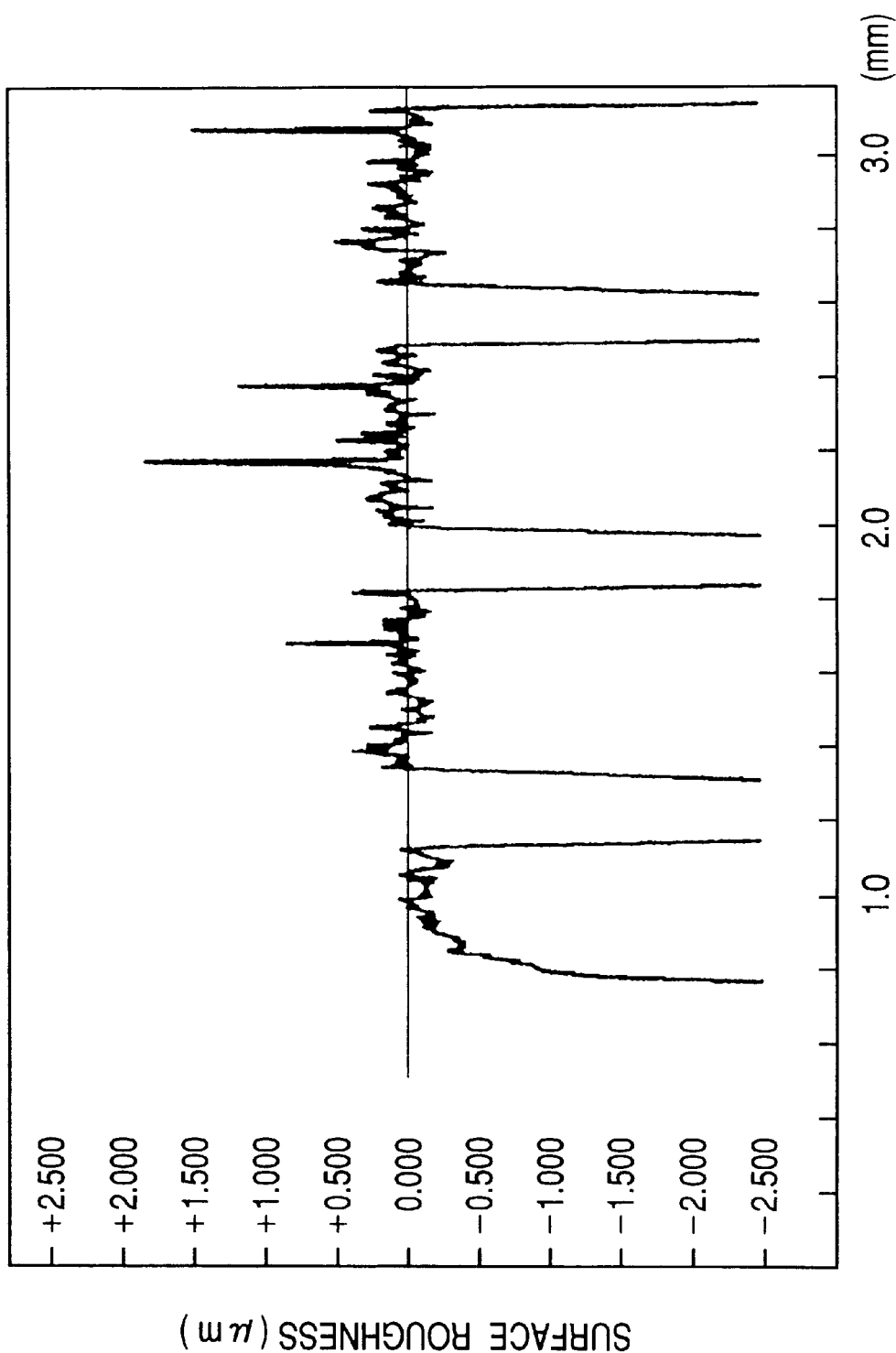
FIG. 7 is a graph showing the result of measurement of surface roughness of an electroless composite plating film.

A plating layer was deposited by the ordinary electroless nickel plating step or electroless composite plating step on the internal surface of each sleeve the base material of which was brass, phosphor bronze, aluminum, or stainless steel. The sleeves were provided with no electrodeposition film. They were assembled in the apparatus of FIGS. 2A to 2C to be evaluated in the manner similar to that in Examples 1 to 4. They showed the large surface roughness as illustrated in FIG. 6 and FIG. 7, suffered the phenomena of irregular rotation, seizure, or the like, and also had quality defects such as adhesion failure or the like. The film performance is listed together in Table 1 below for the electrodeposition films of Examples 1 to 4, and the electroless nickel plating (Ni—P) and the electroless composite plating (Ni—P—SiC) of the comparative examples.

TABLE 1

|  |  | Surface roughness | Static friction | Uniformity |
|---|---|---|---|---|
| Examples 1, 2, 3 and 4 | electro-deposition | ⊚ | ⊚ | ⊚ |
| Comparative Examples | electroless nickel plating (Ni—P) FIG. 6 | ◯ | X | Δ |
|  | electroless composite plating (Ni—P—SiC) FIG. 7 | X | Δ | Δ |

⊚: practically applicable with extreme improvement in performance
◯: practically applicable with improvement in performance
Δ: practically applicable
X: practically unapplicable It is seen from this table that the electrodeposition films with the inorganic particles dispersed therein are the lubricating films extremely effective in preventing the production of wear powder. Similar results were also yielded where the lubricating films were the electrodeposition films having the silicon group.

Figure 8:
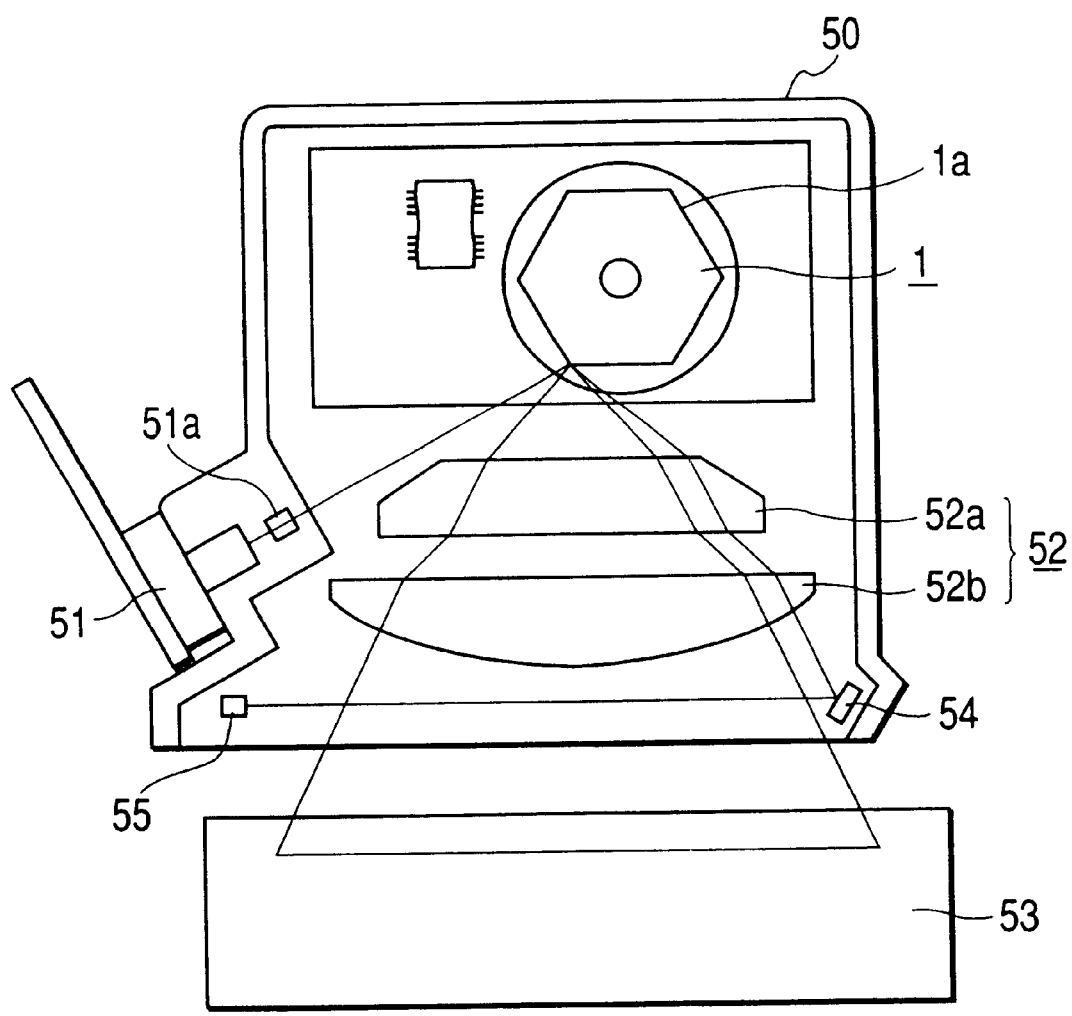
FIG. 8 is a diagram showing the whole of a deflection scanning apparatus.

FIG. 8 shows the whole of a deflection scanning apparatus incorporated in the image forming apparatus of the electrophotographic method, such as the laser beam printers and copying machines. This apparatus has a light source 51 as a light source unit for emitting a light beam (flux of light) such as the laser light or the like, and a cylindrical lens 51a for condensing the laser light into a linear shape on the reflecting facet 1a of the rotary polygon mirror 1, and is arranged to effect deflection scanning with the light beam by rotation of the rotary polygon mirror 1 and guide the light beam through an imaging lens system 52 as an imaging means to focus it on a photosensitive body 53, which is the image plane on a rotary drum. The imaging lens system 52 has a spherical lens 52a, a toric lens 52b, etc. and has the so-called fθ function to correct for scanning speed or the like of a point image formed on the photosensitive body 53.

With rotation of the rotary polygon mirror 1 by the aforementioned motor, the reflecting facets 1a thereof rotate at equal speed about the axis of the rotary polygon mirror 1. Angles between the normal to the reflecting facet 1a of the rotary polygon mirror 1 and the optical path of the light beam emitted from the light source 51 and condensed by the cylindrical lens 51a as described above, i.e., angles of incidence of the light beam to the reflecting facet 1a, vary temporally with rotation of the rotary polygon mirror 1, and angles of reflection also vary similarly. Thus the point image formed on the photosensitive body 53 from the light beam moves (or scans the rotary drum) in the axial direction (or the main scanning direction) of the drum.

The imaging lens system 52 is designed so as to focus the light beam reflected at the rotary polygon mirror 1 into the point image of a predetermined spot shape on the photosensitive body 53 and keep the scanning speed of the point image constant in the main scanning direction.

The point image focused on the photosensitive body 53 forms an electrostatic latent image, based on main scanning with rotation of the rotary polygon mirror 1 and sub-scanning with rotation of the rotary drum having the photosensitive body 53 about the axis thereof.

Around the photosensitive body 53 there are a charging device for uniformly charging the surface of the photosensitive body 53, a developing device for developing the electrostatic latent image formed on the surface of the photosensitive body 53 into a toner image, a transferring device for transferring the toner image onto a recording sheet (these devices being omitted from the illustration), etc., whereby the information recorded by the light beam emitted from the light source 51 is printed on the recording sheet or the like.

A detection mirror 54 reflects the light beam upstream of the main scanning direction with respect to the optical path of the light beam incident to the start position of writing of the recorded information on the surface of the photosensitive body 53, so as to guide the beam onto a photoreceptive surface of a light-receiving element 55 having a photodiode or the like. When the photoreceptive surface is illuminated by the light beam, the light-receiving element 55 outputs a scan start signal for detecting the scanning start position (writing start position).

The light source 51 emits the light beam according to signals supplied from a processing circuit for processing information from a host computer. The signals supplied to the light source 51 correspond to the information to be written on the photosensitive body 53, and the processing circuit supplies each signal indicating information corresponding to one scan line being a locus formed by the point image on the surface of the photosensitive body 53, as one unit, to the light source 51. This information signal is transmitted in synchronism with the scanning start signal supplied from the light-receiving element 55.

The rotary polygon mirror 1, the imaging lens system 52, etc. are contained in the optical box 50, and the light source 51 etc. are attached to a side wall of the optical box 50. The rotary polygon mirror 1, the imaging lens system 52, etc. are first set in the optical box 50, and thereafter a lid (not shown) is placed over an upper opening of the optical box 50.

The present invention presents the effects described below, because of the constitution as described above. Namely, the present invention can provide the hydrodynamic bearing structure having the electrodeposition film excellent in wear resistance.

By providing the electrodeposition film having good lubricity and wear resistance on the fit surface of the hydrodynamic bearing, the invention can realize the inexpensive hydrodynamic bearing apparatus with excellent bearing performance and durability while avoiding the trouble due to the production of wear powder during low-speed rotation. When such a hydrodynamic bearing apparatus is applied to the bearing part of the rotary polygon mirror etc. of the deflection scanning apparatus, the invention can make contribution to enhancement of performance and reduction of cost of the deflection scanning apparatus.

What is claimed is:

1. A hydrodynamic bearing structure comprising:
   a sleeve; and a rod-like shaft fitted in the sleeve;
      wherein at least one of the sleeve and the rod-like shaft is rotatable,
      wherein a fit surface of at least one of the sleeve and the rod-like shaft has an electrodeposition film comprised of a resin consisting of a polymer having 10,000 or more repeating units; and
      wherein at least one of the sleeve and the rod-like shaft is provided with a hydrodynamic groove pattern consisting of a plurality of grooves.

2. The hydrodynamic bearing structure according to claim 1, wherein the surface roughness of the electrodeposition film is not more than 0.5 μm.

3. The hydrodynamic bearing structure according to claim 1, wherein the surface roughness of the electrodeposition film is not more than 0.2 μm.

4. The hydrodynamic bearing structure according to claim 1, wherein the coefficient of static friction 5 of the electrodeposition film is not more than 0.5.

5. The hydrodynamic bearing structure according to claim 1, wherein the coefficient of static friction of the electrodeposition film is not more than 0.2.

6. A rotating apparatus comprising the hydrodynamic bearing structure of claim 1.

7. The rotating apparatus according to claim 6, which is a rotating apparatus of a hard disk.

8. The rotating apparatus according to claim 6, which is constructed so as to be able to rotate at and above 18,000 rpm.

9. A light deflection scanning apparatus comprising:
the hydrodynamic bearing structure of claim 1; and
a deflector for effecting deflection scanning with a beam, the deflector being set on rotating one of the sleeve and the rod-like shaft.

10. An image forming apparatus comprising the light deflection scanning apparatus of claim 9.

11. The image forming apparatus according to claim 10, which is a laser beam printer.

12. The image forming apparatus according to claim 10, which is an electrophotographic image forming apparatus.

13. A hydrodynamic bearing structure comprising:
a sleeve; and a rod-like shaft fitted in the sleeve;
wherein at least one of the sleeve and the rod-like shaft is rotatable,
wherein a fit surface of at least one of the sleeve and the rod-like shaft has an electrodeposition film comprising a silicon-based resin in a resin; and
wherein at least one of the sleeve and the rod-like shaft is provided with a hydrodynamic groove pattern consisting of a plurality of grooves.

14. The hydrodynamic bearing structure according to claim 13 wherein the surface roughness of the electrodeposition film is no more than 0.5 μm.

15. The hydrodynamic bearing structureccording to claim 13, wherein the surface roughness of the electrodeposition film is not more than 0.2 μm.

16. The hydrodynamic bearing structure according to claim 13, wherein the coefficient of static friction of the electrodeposition film is not more than 0.5.

17. The hydrodynamic bearing structure according to claim 13, wherein the coefficient of static friction of the electrodeposition film is not more than 0.2.

18. A rotating apparatus comprising the hydrodynamic bearing structure of claim 13.

19. A light deflection scanning apparatus comprising:
the hydrodynamic bearing structure of claim 13, and
a deflector for effecting deflection scanning with a beam, the deflector being set on rotating one of the sleeve and the rod-like shaft.

20. An image forming apparatus comprising the light deflection scanning apparatus of claim 19.

21. A hydromatic bearing structure comprising:
a sleeve; and a rod-like shaft fitted in the sleeve;
wherein at least one of the sleeve and the rod-like shaft is rotatable,
wherein a fit surface of at least one of the sleeve and the rod-like shaft has an electrodeposition film comprising inorganic particles dispersed in a resin; and
wherein at least one of the sleeve and the rod-like shaft is provided with a hydrodynamic groove pattern consisting of a plurality of grooves.

22. The hydrodynamic bearing structure according to claim 21, wherein the inorganic particles are molybdenum-based particles.

23. The hydrodynamic bearing structure according to claim 22, wherein the molybdenum-based particles are at least one of molybdenum oxide particles, molybdenum disulfide particles, and molybdenum particles.

24. The hydrodynamic bearing structure according to claim 21, wherein the mean particle size of the inorganic particles is not more than 3.0 μm.

25. The hydrodynamic bearing structure according to claim 21, wherein the mean particle size of the inorganic particles is not less than 0.02 μm and not more than 1.0 μm.

26. The hydrodynamic bearing structure according to claim 21, wherein the surface roughness of the electrodeposition film is not more than 0.5 μm.

27. The hydrodynamic bearing structure according to claim 21, wherein the surface roughness of the electrodeposition film is not more than 0.2 μm.

28. The hydrodynamic bearing structure according to claim 21, wherein the coefficient of static friction of the electrodeposition film is not more than 0.5.

29. The hydrodynamic bearing structure according to claim 21, wherein the coefficient of static friction of the electrodeposition film is not more than 0.2.

30. A rotating apparatus comprising the hydrodynamic bearing structure of claim 21.

31. A light deflection scanning apparatus comprising:
the hydrodynamic bearing structure of claim 21, and
a deflector for effecting deflection scanning with a beam, the deflector being set on rotating one of the sleeve and the rod-like shaft.

32. An image forming apparatus comprising the light deflection scanning apparatus of claim 31.

33. A hydrodynamic bearing structure comprising:
a sleeve; and a rod-like shaft fitted in the sleeve;
wherein at least one of the sleeve and the rod-like shaft is rotatable,
wherein a fit surface of at least one of the sleeve and the rod-like shaft has an electrodeposition film wherein the resin is a copolymer resulting from copolymerization between a monomer having an acrylic moiety and a monomer having a melamine moiety; and
wherein at least one of the sleeve and the rod-like shaft is provided with a hydrodynamic groove pattern consisting of a plurality of grooves.

34. The hydrodynamic bearing structure according to claim 33, wherein the surface roughness of the electrodeposition film is not more than 0.5 μm.

35. The hydrodynamic bearing structure according to claim 33, wherein the surface roughness of the electrodeposition film is not more than 0.2 μm.

36. The hydrodynamic bearing structure according to claim 33, wherein the coefficient of static friction of the electrodeposition film is not more than 0.5.

37. The hydrodynamic bearing structure according to claim 33, wherein the coefficient of static friction of the electrodeposition film is not more than 0.2.

38. A rotating apparatus comprising the hydrodynamic bearing structure of claim 33.

39. A light deflection scanning apparatus comprising:
the hydrodynamic bearing structure of claim 33; and
a deflector for effecting deflection scanning with a beam, the deflector being set on rotating one of the sleeve and the rod-like shaft.

40. An image forming apparatus comprising the light deflection scanning apparatus of claim 39.

41. A hydrodynamic bearing apparatus comprising:

a shaft member and a sleeve member fitted so as to be rotatable relative to each other; and a rotary member arranged to rotate together with the shaft member or the sleeve member, wherein an electrodeposition film comprising a silicon-based resin or inorganic particles dispersed therein is formed on a fit surface of at least one of the shaft member and the sleeve member.

42. The hydrodynamic bearing apparatus according to claim 41, wherein the electrodeposition film is formed after completion of an electroconductivizing treatment on the fit surface of at least one of the shaft member and the sleeve member.

43. The hydrodynamic bearing apparatus according to claim 41, wherein the silicon-based resin or the inorganic particles impart a lubricating property to the electrodeposition film.

44. The hydrodynamic bearing apparatus according to claim 41, wherein the surface roughness of the electrodeposition film is not more than 0.2 μm.

45. The hydrodynamic bearing apparatus according to claim 41, wherein the electrodeposition film is a lubricating film having a silicon group.

46. The hydrodynamic bearing apparatus according to claim 41, wherein the inorganic particles are molybdenum or a compound thereof.

47. The hydrodynamic bearing apparatus according to claim 41, wherein the mean particle size of the inorganic particles is 0.02 to 1.0 μm.

48. The hydrodynamic bearing apparatus according to claim 41, wherein the coefficient of static friction of the electrodeposition film is not more than 0.5.

49. A deflection scanning apparatus comprising the hydrodynamic bearing apparatus as set forth in claim 41, and deflection scanning means rotationally supported thereby.

50. A hydrodynamic bearing structure comprising:

a sleeve;

a rod-like shaft fitted in the sleeve;

a hydrodynamic groove consisting of a plurality of grooves provided in at least one of the sleeve and the rod-like shaft;

a chemical conversion film formed on at least one of the sleeve and the rod-like shaft; and an electrodeposition film formed on the chemical conversion film, wherein at least one of the sleeve and the rod-like shaft is rotatable.

51. The hydrodynamic bearing structure according to claim 50, wherein the electrodeposition film is comprised of a resin.

52. The hydrodynamic bearing structure according to claim 50, wherein the chemical conversion film is comprised of an electroconductive film formed by plating.

53. The hydrodynamic bearing structure according to claim 50, wherein the chemical conversion film is formed on the sleeve.

54. The hydrodynamic bearing structure according to claim 53, wherein the sleeve is comprised of a metal.

55. The hydrodynamic bearing structure according to claim 53, wherein the sleeve is comprised of a resin.

56. The hydrodynamic bearing structure according to claim 53, wherein the sleeve is comprised of a ceramic material.

57. The hydrodynamic bearing structure according to claim 50, wherein the chemical conversion film is formed on the rod-like shaft.

58. The hydrodynamic bearing structure according to claim 57, wherein the rod-like shaft is comprised of a metal.

59. The hydrodynamic bearing structure according to claim 57, wherein the rod-like shaft is comprised of a resin.

60. The hydrodynamic bearing structure according to claim 57, wherein the rod-like shaft is comprised of a ceramic material.

61. The hydrodynamic bearing structure according to claim 50, wherein the surface roughness of the electrodeposition film is not more than 0.5 μm.

62. The hydrodynamic bearing structure according to claim 50, wherein the surface roughness of the electrodeposition film is not more than 0.2 μm.

63. The hydrodynamic bearing structure according to claim 50, wherein the coefficient of static friction of the electrodeposition film is not more than 0.5.

64. The hydrodynamic bearing structure according to claim 50, wherein the coefficient of static friction of the electrodeposition film is not more than 0.2.

65. A rotating apparatus comprising the hydrodynamic bearing structure of claim 50.

66. A light deflection scanning apparatus comprising:

the hydrodynamic bearing structure of claim 50; and a deflector for effecting deflection scanning with a beam, the deflector being set on rotating one of the sleeve and the rod-like shaft.

67. An image forming apparatus comprising the light deflection scanning apparatus of claim 66.

68. A method of producing a hydrodynamic bearing apparatus, comprising the step of electrodepositing an electrodeposition paint comprising a silicon-based resin or inorganic particles dispersed therein, on a fit surface of at least one of a shaft member and a sleeve member fitted so as to be rotatable relative to each other.

69. The method according to claim 68, wherein a gap distance between the shaft member and the sleeve member is adjusted by controlling the thickness of the electrodeposition film to be deposited.

* * * * *

UNITED STATES PATENT AND TRADEMARK OFFICE
CERTIFICATE OF CORRECTION

PATENT NO. : 6,409,389 B1
DATED : June 25, 2002
INVENTOR(S) : Kadokura et al.

It is certified that error appears in the above-identified patent and that said Letters Patent is hereby corrected as shown below:

<u>Title page,</u>
Item [56], References Cited, FOREIGN PATENT DOCUMENTS, "63235719 A2" should read -- 63-235719 A2 --; and "7027131" should read -- 7-027131 --.

<u>Column 1,</u>
Line 21, "And" should read -- and --.

<u>Column 10,</u>
Line 26, "rate" should read -- ratio --.

<u>Column 11,</u>
Line 26, "twenty four" should read -- twenty-four --.

<u>Column 15,</u>
Line 4, "5" should be deleted;
Line 37, "claim 13" should read -- claim 13, --;
Line 38, "no" should read -- not --;
Line 39, "structureccording" should read -- structure according --; and
Line 58, "hydromatic" should read -- hydrodynamic --.

Signed and Sealed this

Thirty-first Day of December, 2002

JAMES E. ROGAN
*Director of the United States Patent and Trademark Office*